June 22, 1926.

J. H. RAND

VISIBLE INDEX

Filed Dec. 26, 1923

Inventor
James H. Rand
by Roberts, Roberts & Cushman
Attorneys

June 22, 1926.
J. H. RAND
VISIBLE INDEX
Filed Dec. 26, 1923
1,589,556
2 Sheets-Sheet 2
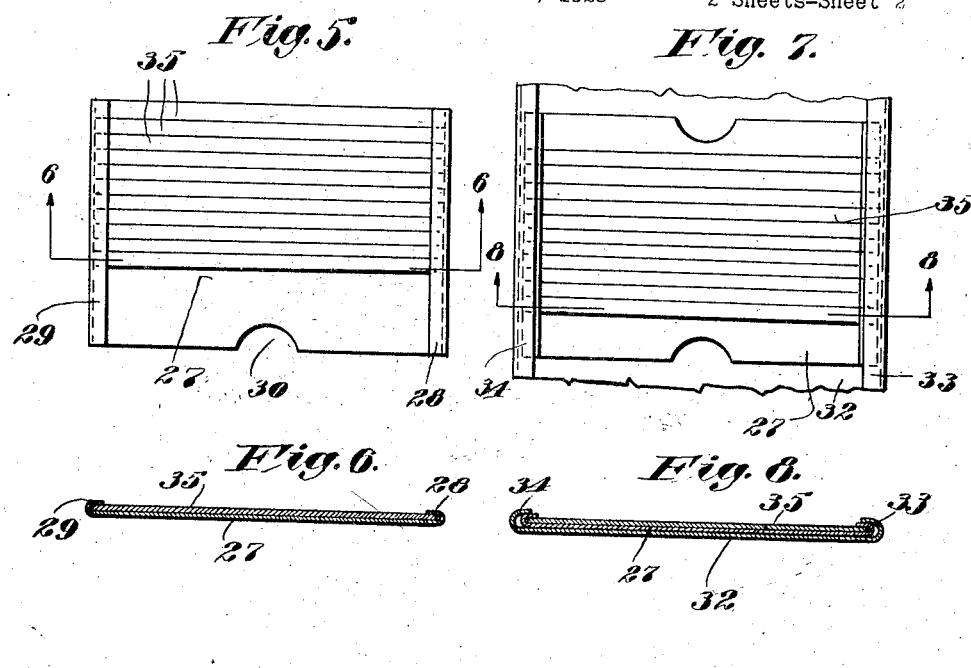
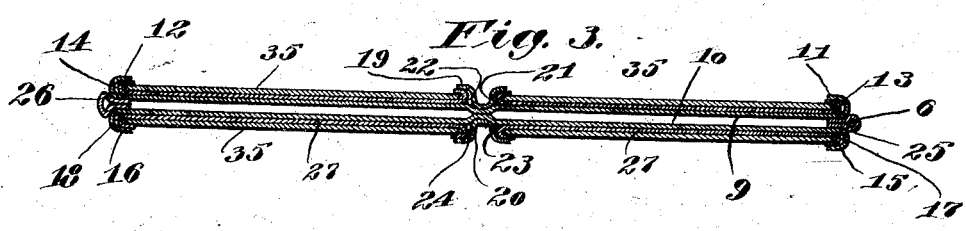
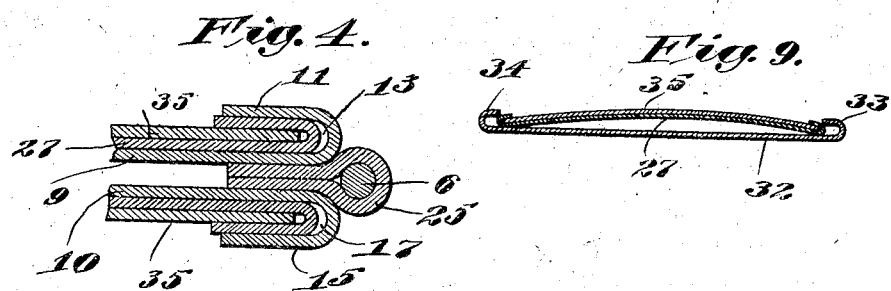
Inventor
James H. Rand
Roberts, Roberts, & Cushman
Attorneys Patented June 22, 1926.

1,589,556

UNITED STATES PATENT OFFICE.

JAMES H. RAND, OF NORTH TONAWANDA, NEW YORK, ASSIGNOR TO RAND KARDEX COMPANY, INC., OF NORTH TONAWANDA, NEW YORK, A CORPORATION OF DELAWARE.

VISIBLE INDEX.

Application filed December 26, 1923. Serial No. 682,643.

This invention relates to indexes of the so called visible type and consists in the novel features hereinafter more fully described and particularly pointed out in the claims, a preferred embodiment of the invention together with slight modifications thereof being illustrated in the accompanying drawings in which:

Fig. 3 is a section on the line 3—3 of Fig. 2;

Fig. 4 is a fragmentary section to larger scale on the line 4—4 of Fig. 2;

Fig. 5 is a front elevation of a removable panel or holder constituting a feature of the invention;

Fig. 6 is a section on the line 6—6 of Fig. 5;

Fig. 7 is a fragmentary front elevation showing a modified form of frame or leaf;

Fig. 8 is a section on the line 8—8 of Fig. 7; and

Fig. 9 is a section similar to Fig. 8 illustrative of one mode of removing the panel from the frame.

Figure 1:
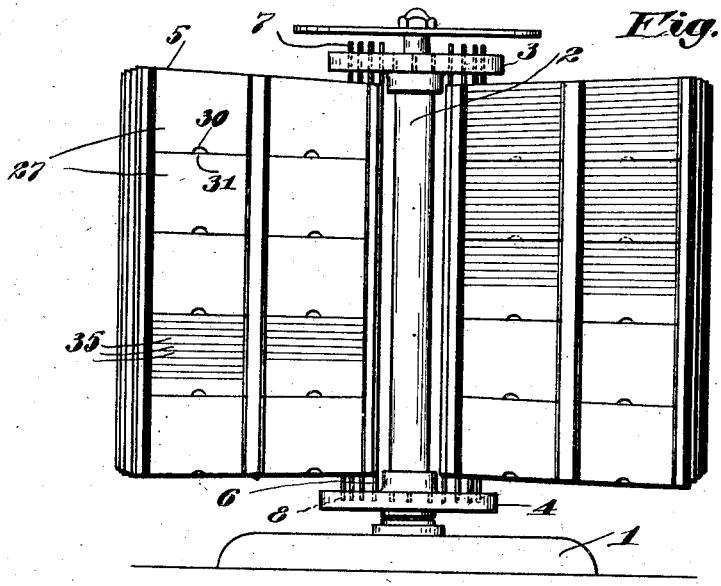
Fig. 1 is a perspective view of an index of the hinged leaf rotary type embodying the present invention.

The numeral 1 indicates a base member which carries the rotary post or support 2. Vertically spaced discs 3 and 4 are mounted respectively adjacent to the upper and lower ends of the post and turn therewith. The numeral 5 indicates one of a series of substantially rigid frames or leaves each of which is furnished at one edge with a rod or hinge pintle 6. The upper end 7 of each rod is adapted to project through an opening in the upper disc 3 while its lower end 8 is seated in an aligned opening in the lower disc 4. Preferably there is sufficient clearance between the upper end of each frame and the disc 3 to permit the frame to be removed from its support by sliding it upwardly until the lower end 8 of the rod is disengaged from the disc 4, whereupon the frame may be swung outwardly and removed from the supporting structure.

In accordance with the present invention each leaf or frame 5 preferably consists of a pair of substantially flat plates 9 and 10 (Figs. 3 and 4) of sheet material secured together in face-to-face relation in any desired manner. The lateral margins of the plate 9 are turned inwardly to provide flanges 11 and 12 which define opposed guide channels 13 and 14 respectively. Similarly the lateral margins of the plate 10 are turned inwardly to form flanges 15 and 16 which provide opposed guide channels 17 and 18 respectively. If the leaves are intended to support two parallel series of index elements as herein shown, members 19 and 20 are respectively secured to the plates 9 and 10 substantially at the central parts thereof and these members are shaped to provide guide channels 21, 22, 23 and 24 which are opposed to the channels 13, 14, 17 and 18 respectively. Preferably a strip 25 of sheet material folded at its middle to form a loop is arranged with its edges interposed between the plates 9 and 10, the loop forming a convenient means for securing the pintle rod 6 to the frame or leaf. A similar strip 26 of sheet material may be secured at the opposite edge of a leaf providing a desirable finish therefor.

A plurality of independent transfer panels or holders 27 are provided for use with the frames or leaves above described. These transfer panels or holders are preferably made of some thin flexible resilient sheet material such for example as aluminum and each panel comprises a substantially flat back or body portion and inwardly directed marginal flanges 28 and 29. The dimensions of these panels are such as to permit them to be slipped edgewise into the open ends of the opposed guide channels of the frames or leaves and the flanges 28 and 29 are of such thickness in a front to rear direction that they fit snugly within the guide channels. Preferably the lower edge of each panel or holder is furnished with a recess 30 of semicircular or other suitable form so as to expose a portion of the transverse edge of the next adjacent panel when a series of the panels are mounted in abutting relationship in one of the supporting frames or leaves.

In Fig. 7 a slightly modified form of frame or supporting leaf is illustrated wherein the frame comprises a single piece 32 of sheet material turned inwardly at its lateral margins to provide flanges 33 and 34 respectively. These flanges furnish opposed guide channels for positioning a single row of the removable transfer panels 27.

The inturned flanges 28 and 29 of the panels 27 furnish opposed channels for positioning removable index slips 35. These slips may be of any suitable width and of any desired material, the term "slip" being employed herein as a convenient expression for designating any removable index element bearing distinguishing characteristics of any shape, size, material or color demanded by the circumstances of the particular case.

As herein shown the index slips are of the relatively narrow type commonly employed for listing names and addresses and the like. These slips are conveniently made of stiff resilient cardboard and are positioned in the panels or holders 27 by springing their ends into the opposed channels provided by the flanges 28 and 29.

In employing indexes of the type to which the present invention relates it frequently becomes desirable either on account of abnormal increase in the number of items in any particular section of the index or by reason of change in the character of the subject matter or system of indexing used to shift certain groups of index slips or elements from one part of the index frame to another without disturbing the relative arrangement of the individual slips constituting the group. Ordinarily this transfer can only be accomplished by removing the slips individually and then carefully reinserting them at the desired point. When a large number of items must be changed or where such changes are of frequent occurrence a great deal of time is lost in this mode of transfer while the possibility of error and inaccuracy is always present. In accordance with this invention groups of index slips or elements of any desired size may be shifted quickly from one part to another of the same frame or to another frame or leaf of the index without the exercise of particular care on the part of the operator and without substantial danger of misplacement of the items.

For example, it being supposed that the items of the group marked X (Fig. 2) are increasing to such an extent as to necessitate more space in that particular portion of the index frame, the items of the group Y carried by the next adjacent panel 27ᵃ may be removed as a whole by sliding the panel downwardly from the lower end of the supporting leaf or frame and reinserting the panel at the top of the next adjacent pair of guide channels. An empty panel may then be substituted for the panel 27ᵃ and the group X may be expanded to fill this empty panel.

As the backs of the panels all lie substantially in the same plane, it is possible to move index slips from one panel to an adjacent panel by sliding them edgewise so that if part of a group of index elements which it is desired to transfer are mounted in one panel while the rest are mounted in the adjacent panel, the first named elements may readily be slid to the second panel before removing the latter from the frame. Furthermore, any desired groups or combinations of index elements may be assembled from different parts of the index by placing the panels carrying such fragmentary groups in juxtaposition in the same pair of guide channels and sliding the index elements constituting such fragmentary groups edgewise until the complete group has been built up, any empty panels being removed and replaced by full or partially filled panels during the process.

Figure 2:
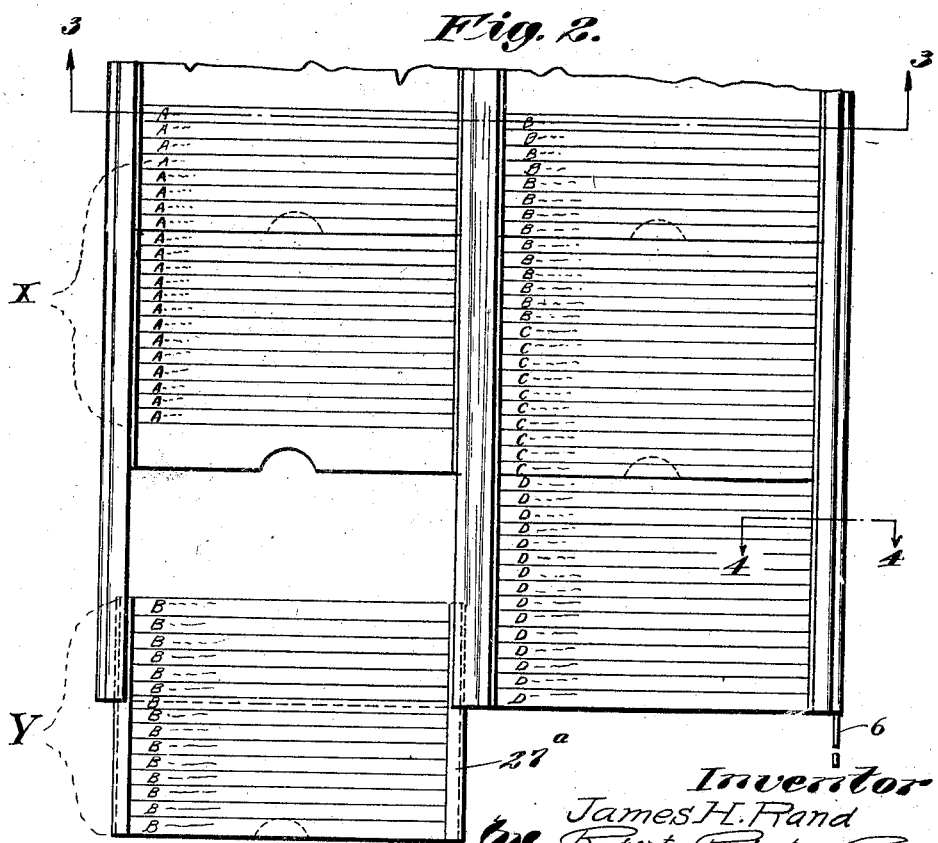
Fig. 2 is a fragmentary front elevation of one leaf of the index of Fig. 1 to larger scale and illustrating details of the present invention.

In the device illustrated in Figs. 1, 2 and 3 the leaves or frames are of duplex construction being provided with guide channels upon both faces and also being furnished with a plurality of pairs of guide channels upon each face. While this arrangement is desirable in certain types of index, it is contemplated that in other types the supporting frame or leaf will be provided only upon one face with the guide channels for receiving the transfer panels as indicated in Figs. 7 and 8.

While the panels may be removed from the guide grooves by sliding them downwardly or upwardly from the ends of such grooves it is convenient at times, as for example when a panel is to be removed from an intermediate point in the series, to spring the panels outwardly away from the frame as indicated in Fig. 9 until they can be removed from between the channel forming flanges. The recesses 30 facilitate this mode of removal as it is possible to insert some suitable instrument, as for example the finger nail, beneath the exposed edge of the next adjacent panel thereby to spring the latter away from the frame. As shown in Figs. 1 to 5 inclusive the lower edge only of the panel is furnished with such a recess but as indicated in Fig. 7 both upper and lower edges may be so provided if desired.

While the present invention is very useful in connection with indexes having hinged leaves such as herein illustrated it is evident that it may find use in indexes of other types employing substantially rigid supporting frames adapted removably to hold interchangeable transfer panels of the type herein disclosed.

I claim:

1. An index, comprising a frame having marginal channels thereon in opposed parallel position, a plurality of panels removably mounted therein, said panels each having an open front, a flexible metal back, and opposed marginal channels adapted to receive index slips therebetween and to retain the same simultaneously with the flexing of the back for insertion into or removal from the channels of said frame.

2. An index, comprising a frame having marginal channels thereon in opposed parallel position, a plurality of panels removably mounted therein, said panels each having an open front, a flexible metal back, and opposed marginal channels, said back and channels being in abutting alignment with the backs and channels of adjacent panels, respectively, and adapted to receive index slips therebetween and to retain the same simultaneously with the flexing of the back for insertion into or removal from the channels of said frame.

3. An index consisting of a series of panels formed from sheet material and each comprising a substantially flat back having flanges at its lateral edges for positioning index slips, and means for holding said panels in alignment with their backs in substantially the same plane and with the transverse edges of adjacent panels having a recess to facilitate insertion of an instrument behind the abutting edge of the adjacent panel for removing the latter from the holding means.

4. An index consisting of a series of panels formed from thin sheet material each comprising a flat back having forwardly and inwardly bent flanges at its lateral margins, and a frame for holding the panels with their backs in substantially the same plane and with the transverse edges of adjacent panels in abutting relation, the lower marginal portion of the back of each panel being a substantially semicircular recess to facilitate insertion of an instrument behind the next panel below for removing the latter from the frame.

Signed by me at Boston, Massachusetts, this 18th day of December, 1923.

JAMES H. RAND.